(12) United States Patent
Zhang et al.

(10) Patent No.: US 10,241,343 B2
(45) Date of Patent: Mar. 26, 2019

(54) 3D CONVERSION LENS, 3D GLASSES AND CONTROL METHOD THEREOF

(71) Applicants: BOE TECHNOLOGY GROUP CO., LTD., Beijing (CN); Beijing Boe Display Technology Co., Ltd., Beijing (CN)

(72) Inventors: Chunbing Zhang, Beijing (CN); Xin Gai, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 352 days.

(21) Appl. No.: 14/436,160

(22) PCT Filed: Aug. 29, 2014

(86) PCT No.: PCT/CN2014/085528
§ 371 (c)(1),
(2) Date: Apr. 16, 2015

(87) PCT Pub. No.: WO2015/131512
PCT Pub. Date: Sep. 11, 2015

(65) Prior Publication Data
US 2016/0246066 A1      Aug. 25, 2016

(30) Foreign Application Priority Data

Mar. 6, 2014   (CN) .......................... 2014 1 0081590

(51) Int. Cl.
*G02B 26/02* (2006.01)
*G02B 27/22* (2018.01)
(Continued)

(52) U.S. Cl.
CPC ......... *G02B 27/2264* (2013.01); *G02B 26/02* (2013.01); *G02F 1/167* (2013.01);
(Continued)

(58) Field of Classification Search
CPC ............. G02F 1/167; G02F 2001/1676; G02F 1/133377; G02F 1/1334; G02F 1/134363;
(Continued)

(56) References Cited

U.S. PATENT DOCUMENTS

| | | | |
|---|---|---|---|
| 3,756,693 A * | 9/1973 | Ota ........................ | G03G 17/04 204/643 |
| 6,184,856 B1 * | 2/2001 | Gordon, II .............. | G02F 1/167 345/107 |

(Continued)

FOREIGN PATENT DOCUMENTS

| | | |
|---|---|---|
| CN | 1410823 | 4/2003 |
| CN | 201903702 | 7/2011 |

(Continued)

OTHER PUBLICATIONS

International Search Report and Written Opinion from PCT/CN2014/085528 dated Dec. 12, 2014.
(Continued)

*Primary Examiner* — William R Alexander
*Assistant Examiner* — Balram T Parbadia
(74) *Attorney, Agent, or Firm* — Calfee, Halter & Griswold LLP

(57) ABSTRACT

A 3D conversion lens and a control method thereof are disclosed. The 3D conversion lens has a first substrate and a second substrate, the first substrate and the second substrate forming a box; electronic ink, the electronic ink filling in the box cavity of the box, and the electronic ink has opaque charged particles, the opaque charged particles have opaque pigment; an electrode formed on the first substrate;

(Continued)

and an electrode formed on at least one side wall of the box cavity. With the conventional liquid crystal layer replaced by electronic ink, 3D display effect of the glasses is realized by controlling positive and negative polarity of the transparent electrodes on the substrate and the side wall of the box cavity. In this way, it is unnecessary to control and realize deflection of the liquid crystals, which simplifies the circuit structure and the preparation process of the 3D glasses.

18 Claims, 1 Drawing Sheet

(51) Int. Cl.
  *G02F 1/167* (2019.01)
  *G02F 1/1675* (2019.01)
(52) U.S. Cl.
  CPC ........... *G02F 2001/1676* (2013.01); *G02F 2001/1678* (2013.01)
(58) Field of Classification Search
  CPC ......... G02F 2001/1672; G02F 2201/12; G02F 2203/01; G02B 27/22; G02B 27/2264; G02B 1/06; G02B 27/2214; G02B 26/02; H04N 13/0434; H04N 5/2254; E06B 2009/2464
  See application file for complete search history.

(56) References Cited

U.S. PATENT DOCUMENTS

| | | | | |
|---|---|---|---|---|
| 6,865,010 | B2* | 3/2005 | Duthaler | G02F 1/167 359/296 |
| 7,639,428 | B2 | 12/2009 | Kato et al. | |
| 7,999,787 | B2* | 8/2011 | Amundson | G02F 1/167 345/108 |
| 8,390,918 | B2* | 3/2013 | Wilcox | G02F 1/167 359/296 |
| 2002/0011986 | A1* | 1/2002 | Hasegawa | B06B 1/0688 345/108 |
| 2003/0030884 | A1 | 2/2003 | Minami | |
| 2003/0214479 | A1* | 11/2003 | Matsuda | G02F 1/167 345/107 |
| 2003/0231162 | A1* | 12/2003 | Kishi | G02F 1/167 345/107 |
| 2004/0145696 | A1* | 7/2004 | Oue | G02F 1/167 349/167 |
| 2005/0012881 | A1* | 1/2005 | Liang | G02B 27/22 349/115 |
| 2006/0209388 | A1 | 9/2006 | Whitesides et al. | |
| 2012/0159778 | A1 | 7/2012 | Shiau et al. | |

FOREIGN PATENT DOCUMENTS

| | | | | |
|---|---|---|---|---|
| CN | 102141707 | | 8/2011 | |
| CN | 102213835 | | 10/2011 | |
| CN | 202453620 | | 9/2012 | |
| CN | 102749716 | | 10/2012 | |
| CN | 102749716 A | * | 10/2012 | ............ G02B 27/22 |
| CN | 202548438 | | 11/2012 | |
| CN | 103885172 | | 6/2014 | |
| EP | 2472884 A2 | | 7/2012 | |
| JP | 4164308 | | 10/2008 | |

OTHER PUBLICATIONS

Office action from Chinese Application No. 201410081590.5 dated Aug. 3, 2015.
Extended Search Report for European Patent Application No. 14861176.7 dated Oct. 17, 2017.

* cited by examiner

3D CONVERSION LENS, 3D GLASSES AND CONTROL METHOD THEREOF

RELATED APPLICATIONS

The present application claims the benefit of PCT/CN2014/085528 filed Aug. 29, 2014, which claims the benefit of Chinese Patent Application No. 201410081590.5, filed Mar. 6, 2014, the entire disclosure of which is incorporated herein by reference.

FIELD OF THE INVENTION

This disclosure relates to 3D technical field, particularly to a 3D conversion lens, a 3D glasses, and a 3D conversion control method.

BACKGROUND OF THE INVENTION

At present, 3D movie/TV has heated up quietly. The 3D technology can make the image become solid and living, the basic principle thereof is namely enabling the left and right eyes of a person to receive different images by wearing a 3D device such as 3D glasses, then performing superposition and reproduction to the image information through the brain to constitute an image with a three-dimensional direction effect of front-behind, up-down, left-right, far-near and so on.

The most popularly applied at present is 3D shutter glasses, which makes use of a liquid crystal box structure, and controls the deflection of the liquid crystal using an electric field to realize 3D display. The 3D glasses of the liquid crystal box structure, due to the problem of liquid crystal deflection, has a complex circuit design; its upper and lower substrates are both arranged with an ITO (indium tin oxide) transparent electrode layer, the ITO has certain absorption function to light, which reduces the light transmissive rate at a certain extent; in addition, the ITO is coated on the entire substrate, the use ratio of the raw material is not high.

CONTENT OF THE DISCLOSURE

The technical problem to be solved by this disclosure is how to simplify the structure of the 3D glasses, so as to avoid complex circuit design brought by liquid crystal deflection. This disclosure provides a 3D conversion lens, comprising: a first substrate and a second substrate, the first substrate and the second substrate forming a box; electronic ink, the electronic ink being filled in the box cavity of the box, and the electronic ink comprising opaque charged particles; an electrode formed on the first substrate; and an electrode formed on at least one side wall of the box cavity.

According to a first aspect of this disclosure, this disclosure provides a 3D conversion lens, comprising a first substrate and a second substrate, the first substrate and the second substrate forming a box; electronic ink, the electronic ink being filled in the box cavity of the box, and the electronic ink comprising opaque charged particles; an electrode formed on the first substrate; and an electrode formed on at least one side wall of the box cavity.

According to a second aspect of this disclosure, this disclosure provides a 3D glasses, comprising a 3D conversion lens, a power module connected with a peripheral circuit of the 3D conversion lens, and control means connected with the power module and the peripheral circuit of the 3D conversion lens. The 3D glasses uses a 3D conversion lens as stated above; the control means comprises a power control module connected with the power module, for controlling the power module to switch polarity of voltages applied on respective transparent electrodes.

According to a third aspect of this disclosure, this disclosure provides a 3D conversion control method, comprising: providing a first substrate and a second substrate for forming a box, wherein an electrode is formed on the first substrate, an electrode is formed on at least one side wall of the box cavity of the box; filling electronic ink in the box cavity of the box, the electronic ink comprising opaque charged particles; when the polarity of the electrode on the side wall of the box cavity is opposite to the polarity of the charges carried by the opaque charged particles, the opaque charged particles moving to the side wall of the box cavity to realize light transmissive display; when the polarity of the electrode on the first substrate is opposite to the polarity of the charges carried by the opaque charged particles, the opaque charged particles moving to the first substrate to realize non light transmissive display.

The above technical solutions have the following advantages: replacing the conventional liquid crystal layer with the electronic ink, and enabling the charges carried by the opaque charged particles e.g. microcapsules in the electronic ink have the same polarity. Thus the 3D display effect of the glasses can be achieved by controlling the positive and negative polarity of the electrodes on the substrate. When the polarity of the electrode on the side wall of the box cavity is opposite to the polarity of the charges carried by the microcapsules, the opaque charged particles e.g. microcapsules move to the side wall of the box cavity to realize light transmissive display; when the polarity of the electrode on the first substrate is opposite to the polarity of the charges carried by the opaque charged particles e.g. microcapsules, the opaque charged particles e.g. microcapsules move to the first substrate to realize non light transmissive display. Compared with the prior art, it is unnecessary to control and realize deflection of the liquid crystals, which can simplify the circuit structure, and simplify the preparation process of the 3D glasses.

Figure 1:
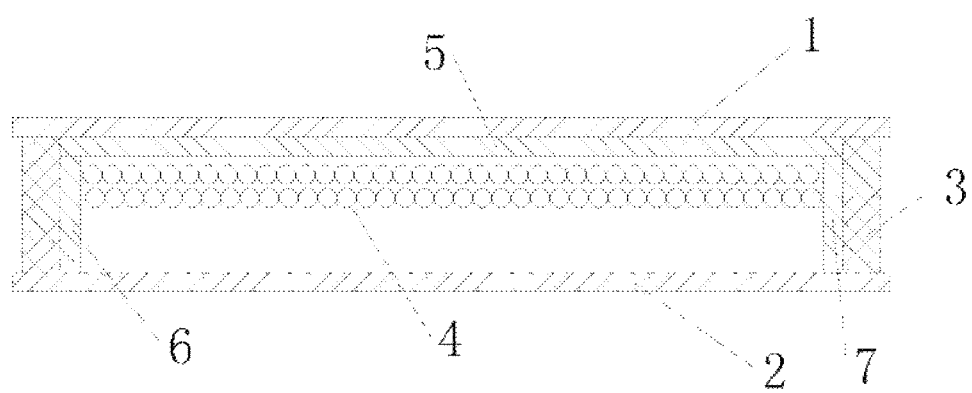
FIG. 1 is a structural schematic view of a 3D conversion lens of Embodiment 1 of this disclosure.

Wherein, 1: first substrate; 2: second substrate; 3: frame sealing glue; 4: microcapsule; 5: block transparent electrode; 6: left electrode; 7: right electrode; 8: strip transparent electrode; 9: transparent resin grid.

DETAILED DESCRIPTION OF THE INVENTION

Next, the specific implementing modes of this disclosure will be further described in detail combined with the drawings and the embodiments. The following embodiments are used for explaining this disclosure, but not for limiting the scope of this disclosure.

In the description of this disclosure, it shall be noted that the orientation or position relationships indicated by the terms "up", "down", "left", "right", "top", "bottom" etc. are orientation or position relationships as shown in the drawings, only for the convenience of describing this disclosure and simplifying the description, rather than indicating or implying that the indicated means or components must have particular orientations, and must be constructed and operated in particular orientations, therefore, it cannot be understood as limitations to this disclosure. In addition, in the description of this disclosure, the meaning of "a plurality of" is two or more than two unless otherwise specified; "first", "second" are only used for the purpose of describing, and cannot be understood as indicating or implying relative importance.

In order to simplify the complexity of the circuit design when driving the 3D glasses formed by a liquid crystal layer, this disclosure provides a 3D conversion lens of a new structure, electronic ink is used to replace the liquid crystal layer structure, the microcapsules of the electronic ink are set to carry charges of the same polarity, and the microcapsules are filled with black pigment, the polarity of the transparent electrode on the substrate of the box cavity where the electronic ink locates and the polarity of the transparent electrode on the side wall of the box cavity are controlled to realize change of the positions of the microcapsules, thereby realizing light transmissive and non light transmissive display of the lens, so as to achieve 3D viewing effect.

Embodiment 1

Referring to FIG. 1, which is a structural schematic view of a 3D conversion lens of the present embodiment. The lens comprises a first substrate 1 and a second substrate 2 of box aligning. The first substrate 1 and the second substrate 2 are both transparent substrates. The first substrate 1 and the second substrate 2 form a box through frame sealing glue 3. The box cavity is filled with electronic ink. A block transparent electrode 5 is formed on the first substrate. A left electrode 6 and a right electrode 7 are formed on the side walls, i.e., the frame sealing glue 3, of the two opposite sides of the box cavity.

The general working principle of the electronic ink is: the surface of the electronic ink screen is attached with many "microcapsules" of small volumes, in which charged particles are encapsulated, for example, black particles with negative electricity and white particles with positive electricity, particles of different colors are arranged in order by changing the charges, thereby presenting a black-and-white visual effect. The electronic ink seeks like a bottle of ordinary ink for naked eyes, however, there are millions of minute microcapsules suspending in the liquid of electronic ink, the interior of each capsule is a mixture of pigment and pigment chips, these minute chips can be affected by the charge effect.

In this embodiment, the charges carried by microcapsules 4 in the electronic ink are set to have the same polarity, the pigment in the microcapsules 4 is set to be black pigment.

Take the example that the charges carried by the microcapsules 4 are positive charges, when the lens of this embodiment performs 3D viewing, the block transparent electrode 5 is controlled to be negative polarity, no voltage is applied on the left electrode 6 and the right electrode 7, here, the microcapsules 4 are attracted by the block transparent electrode 5 and are uniformly distributed at one side of the first substrate 1, because it is the black pigment in the microcapsules 4, the lens here is non light transmissive display; or, the left electrode 6 and the right electrode 7 are controlled to be negative polarity, no voltage is applied on the block transparent electrode 5, here, the microcapsules 4 are attracted by the left electrode 6 and the right electrode 7, and are uniformly distributed at the sides of the left electrode 6 and the right electrode 7, no microcapsule is distributed at the side of the first substrate 1, so, here the lens is light transmissive display. When the charges carried by the microcapsules 4 are negative charges, according to the electrophoretic effect, the light transmissive and non light transmissive display can be namely realized by controlling polarity on the corresponding electrode, the principle is simple, and will not be repeated here.

In order to shorten the response time of the microcapsules and improve sensibility of the lens, this embodiment set the microcapsules as hollow capsules, under the same electric field effect, since the hollow capsules have a relatively light weight, it is favorable to increase response speed of the microcapsules and achieve the aim of quick response of the 3D glasses. However, it should be noted that this disclosure is not limited to this, moreover, it may also use microcapsules with an average density consistent with the electronic ink liquid advantageously.

On the basis of the above structure setting, this embodiment further needs to form a strip transparent electrode 8 on the second substrate. The strip transparent substrate 8 is located at the end portion of the second substrate 2, serving as a reference electrode. Thus, there is no electrode distribution in the middle area of the second substrate, the transmissivity of the middle part of the lens is higher than the transmissivity of the conventional 3D lens on the two substrates of which are both block transparent electrodes, moreover, it can save raw material and reduce production cost.

In this embodiment, the electrodes on side walls of the box cavity are also not only limited to be arranged on two opposite side walls of the box cavity, it may also arrange block transparent electrodes on all of the four side walls of the box cavity, so as to increase the electric field distribution area and further increase the response speed of the microcapsules.

The above mentioned block transparent electrode, left electrode, right electrode, strip transparent electrode that need to be set as transparent electrodes can all use ITO (indium tin oxide) or IZO (indium zinc oxide).

The microcapsules of this embodiment may be carbon black (black) balls made from various metal oxides, wherein the microcapsules are made into a hollow structure, mainly for reducing the density of the microcapsule itself, so as to achieve the aim of quick response; because as shutter glasses, the response frequency thereof is required to be 60 Hz, it is favorable to increase the response speed as a hollow structure.

Wherein the hollow microcapsules select non magnetic metal oxides of low density, e.g. aluminum oxide etc.; the spherical alumina precursor takes the cheap aluminium chloride as the alumina precursor, takes water as the reaction medium, which is convenient for operation and easy for spreading, therefore, it is economical.

The electronic ink in this embodiment, as for the proportion of the microcapsules relative to the dispersion liquid (dispersion medium), the proportion of the microcapsules relative to dispersion liquid (dispersion medium) 100 weight parts may be, for example, from 0.1 weight parts to 15 weight parts, preferably from 1 weight parts to 10 weight parts. The dispersion liquid (dispersion medium) may be colorless transparent liquid with insulation characteristics, specifically, non polar dispersion medium, more specifically, it is aliphatic hydrocarbon, aromatic hydrocarbon, halogenated hydrocarbon and silicone oil etc.

The preparation of the microcapsule may adopt the following process, specifically as follows:

Firstly, a polystyrene sphere carrier is fabricated.

The emulsion polymerization method is used to prepare a template polystyrene sphere of sub micron dimension, at 10~40 degrees, the monomer styrene of 20~30 mL and the deionized water in a volume ratio of 10:1~1:1 with the styrene are added into a three-mouth bottle under the protection of nitrogen gas, under the stirring condition of 100~500 RPM, it is stirred for 20~30 minutes, the water bath is heated up to 60~80 degrees at the rate of 0.5~5 degrees per minute, an aqueous solution of initiator of potassium persulfate with the concentration of 10~30 g/L is prepared, then the aqueous solution of potassium persulfate of 10~50 mL is dropped into the three-mouth bottle, and reacts for 10~24 hours at 60~80 degrees, centrifugal separation is performed after the reaction liquid has been cooled for 10~40 degrees, it is washed by deionized water and ethanol for 1~3 times respectively to obtain the template polystyrene sphere of sub micron dimension;

Then, preparation of a polystyrene sphere coated with cobalt ferrite precursor and a magnetic cobalt ferrite hollow sphere is performed.

At 10~40 degrees, the template polystyrene sphere of 50~200 mg is placed in a mixed aqueous solution of inorganic two bivalent cobalt salt and trivalent ferric salt of 50~100 mL for ultrasonic dispersion for 20~30 minutes, wherein the ionic concentration of the two bivalent cobalt ion is 0.01~0.05 mol/L. The molar concentration ratio of the trivalent ferric ion and the two bivalent cobalt ion is 3:1~1:1, this suspension liquid is moved to a four-mouth bottle, deionized water of 50~100 mL is added under the stirring condition, the water bath rises to 60~80 degrees, sodium hydroxide aqueous solution of 0.5~3 mol/L is dropped into the four-mouth bottle, until the reaction PH value arrives at 11~14, it is cooled naturally after it has reacted for 2~5 hours at 60~80 degrees, then centrifugal separation is performed, it is washed by deionized water and ethanol for 1~3 times respectively, and dried for 12~24 hours at 60~80 degrees, it is cooled naturally to obtain the polystyrene sphere coated with cobalt ferrite precursor, the polystyrene sphere coated with cobalt ferrite precursor is placed in a muffle furnace, and heated up to 300~500 degrees at the rate of 2~10 degrees per minute, which keeps for 1~3 hours, then the sample is cooled naturally for 10~40 degrees with the temperature of the furnace, to obtain the magnetic cobalt ferrite hollow sphere.

Next, the alumina hollow sphere is prepared.

At 10~40 degrees, the polystyrene sphere coated with cobalt ferrite precursor or the magnetic cobalt ferrite hollow sphere of 50~500 mg is dispersed ultrasonically in the sodium chloride aqueous solution of polyethyleneimine of 50~100 mL for 2~10 minutes, after it is stirred for 20~60 minutes, centrifugal separation is performed, it is washed by deionized water for 1~3 times, the washed particles are dispersed ultrasonically in the deionized water of 30~100 mL for 2~10 minutes, then it is moved into the four-mouth bottle, and is stirred at 20~40 degrees, an aluminum trichloride solution of 0.5~10 mL with the concentration of 1~5 mol/L is added into the four-mouth bottle, and is stirred for 30~60 minutes, ammonia of 3~30 mL with the concentration of 5~15 mol/L is added therein drop by drop, after it has reacted for 2~24 hours, magnetic separation is performed, it is washed by deionized water and ethanol for 1~5 times respectively, and dried for 10~24 hours at 50~70 degrees to obtain an alumina coated sphere, this sphere is placed in the muffle furnace, and is heated up to 200~500 degrees at the rate of 2~10 degrees per minute, which keeps for 1~3 hours, then, the alumina hollow sphere is fabricated.

Finally, carbon black or aniline black dyes are coated to the alumina hollow sphere to obtain a hollow black microcapsule through solidification.

Embodiment 2

Figure 2:
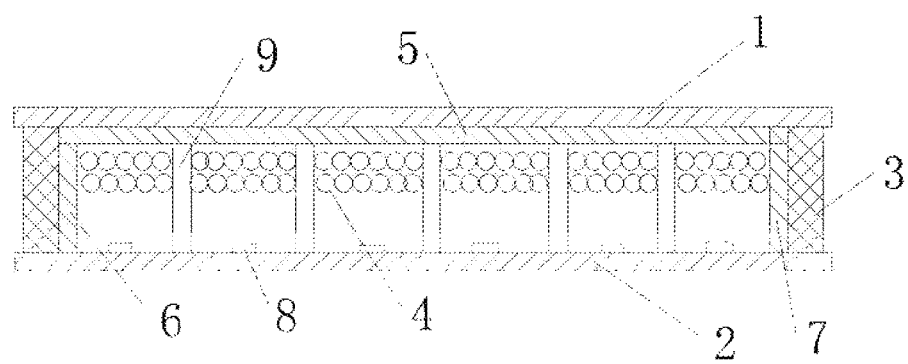
FIG. 2 is a structural schematic view of a 3D conversion lens of Embodiment 2 of this disclosure.

Referring to FIG. 2, which is a structural schematic view of a 3D conversion lens of the present embodiment. The structure of the 3D conversion lens of the present embodiment is further improved on the basis of Embodiment 1, the box cavity is divided into a plurality of small cavities from a large cavity, although each small cavity differs from the original large cavity in size, it is completely the same as the larger cavity in the structure principle.

Specifically, a plurality of grids 9, preferably transparent grids 9, are arranged at intervals within the box cavity. The plurality of transparent grids 9 are arranged perpendicular to the first substrate 1 and the second substrate 2, the box cavity is divided into a plurality of sub-cavities through the transparent grids 9, a block transparent electrode is arranged on the two side walls of the transparent grid 9 respectively, the transparent grid 9 may be made from resin materials. Further, a strip transparent electrode 8 is arranged on the second substrate 2 in each of the sub-cavities, the strip transparent electrode 8 is located at the end portion of the second substrate, serving as a reference electrode.

In this embodiment, after the large cavity is divided into a plurality of small cavities, the first substrate of each small cavity has a block transparent electrode, the opposite side walls of the small cavity have block transparent electrodes, which can also realize transparent and non-transparent display from a single small cavity to the whole box cavity according to the control process as stated in Embodiment 1.

The arrangement of a plurality of small cavities can, within a relatively small scope, make use of the same electric field distribution, to increase the speed of the microcapsules for approaching the transparent electrode, i.e., increasing the response speed of the microcapsules and improving sensitivity of the 3D glasses.

Embodiment 3

Based on the above Embodiment 1 and Embodiment 2, this disclosure further provides a 3D glasses, comprising a 3D conversion lens, a power module connected with a peripheral circuit of the 3D conversion lens, and control means connected with the power module and the peripheral circuit of the 3D conversion lens, wherein the 3D glasses uses a 3D conversion lens as stated above; the control means comprises a power control module connected with the power module, for controlling the power module to switch polarity of voltages applied on respective transparent electrodes, such as the electrode on the first substrate, the electrode at the frame sealing glue side, the electrode on the second substrate and the electrode on the transparent grid.

Embodiment 4

This disclosure further provides a 3D conversion control method, the method may comprise: providing a first substrate and a second substrate for forming a box, wherein an electrode is formed on the first substrate, an electrode is formed on at least one side wall of the box cavity of the box; filling electronic ink in the box cavity of the box, the electronic ink comprising opaque charged particles; when the polarity of the electrode on the side wall of the box cavity is opposite to the polarity of the charges carried by the opaque charged particles, the opaque charged particles moving to the side wall of the box cavity to realize light transmissive display; when the polarity of the electrode on the first substrate is opposite to the polarity of the charges carried by the opaque charged particles, the opaque charged particles moving to the first substrate to realize non light transmissive display.

Preferably, the electrode formed on the first substrate may be a block transparent electrode.

Preferably, the electrode formed on at least one side wall of the box cavity may be a block transparent electrode, and is arranged on at least two opposite side walls of the box cavity.

In a variant embodiment of this disclosure, a plurality of grids are arranged at intervals in the box cavity, the plurality of grids divide the box cavity into a plurality of sub-cavities, electrodes are arranged on side walls of the plurality of sub-cavities. Preferably, the electrodes arranged on side walls of the plurality of sub-cavities are block transparent electrodes, and are arranged on the two side walls of the sub-cavity respectively.

The structure and preparation process of the microcapsules in respective embodiments of this disclosure are same as those in Embodiment 1, which will not be repeated here.

From the above embodiments it can be seen that this disclosure replaces the conventional liquid crystal layer with the electronic ink, and enables the charges carried by the opaque charged particles e.g. microcapsules in the electronic ink have the same polarity. Thus the 3D display effect of the glasses can be achieved by controlling the positive and negative polarity of the electrodes on the substrate. When the polarity of the electrode on the side wall of the box cavity is opposite to the polarity of the charges carried by the microcapsules, the opaque charged particles e.g. microcapsules move to the side wall of the box cavity to realize light transmissive display; when the polarity of the electrode on the first substrate is opposite to the polarity of the charges carried by the opaque charged particles e.g. microcapsules, the opaque charged particles e.g. microcapsules move to the first substrate to realize non light transmissive display. Compared with the prior art, it is unnecessary to control and realize deflection of the liquid crystals, which can simplify the circuit structure, and simplify the preparation process of the 3D glasses.

The above are only preferred implementing modes of this disclosure, it should be pointed out that the ordinary skilled person in the art, on the premise of not departing from the technical principle of this disclosure, may also make some improvement and replacement, these improvement and replacement should also be regarded as the protection scopes of this disclosure.

The invention claimed is:

1. A 3D conversion lens, comprising:
    a first substrate and a second substrate, the first substrate and the second substrate forming a box;
    electronic ink, the electronic ink being filled in a box cavity of the box, and the electronic ink consisting of a dispersion medium and opaque charged particles dispersed in the dispersion medium;
    a first electrode formed on the first substrate; and
    a second electrode formed on at least one side wall of the box cavity, wherein
    the opaque charged particles are microcapsules, and
    charges carried by all the opaque charged particles in the electronic ink have the same polarity.

2. The 3D conversion lens as claimed in claim 1, wherein the 3D conversion lens further comprises a reference electrode formed on an end portion of the second substrate.

3. The 3D conversion lens as claimed in claim 2, wherein the reference electrode formed on the second substrate is a strip transparent electrode.

4. The 3D conversion lens as claimed in claim 1, wherein the 3D conversion lens further comprises a plurality of grids arranged at intervals within the box cavity, the plurality of grids divide the box cavity into a plurality of sub-cavities, and a plurality of second electrodes are arranged on the side walls of the plurality of sub-cavities.

5. The 3D conversion lens as claimed in claim 4, wherein the 3D conversion lens further comprises a reference electrode arranged on the second substrate in each of the sub-cavities.

6. The 3D conversion lens as claimed in claim 5, wherein the reference electrode is a strip transparent electrode located at the end portion of the second substrate.

7. The 3D conversion lens as claimed in claim 4, wherein the grids are transparent grids and are made from resin materials.

8. The 3D conversion lens as claimed in claim 4, wherein the plurality of second electrodes arranged on the side walls of the plurality of sub-cavities are block transparent electrodes, and are arranged on the two side walls of the sub-cavities respectively.

9. The 3D conversion lens as claimed in claim 1, wherein the opaque charged particles are uniformly distributed at one side of the first substrate when a transparent electrode formed on the first substrate is negative polarity while the second electrode formed on at least one side wall of the box cavity is uncharged.

10. The 3D conversion lens as claimed in claim 1, characterized in that the opaque charged particles are uniformly distributed at an electrode side formed on at least one side wall of the box cavity when a transparent electrode formed on the first substrate is not applied with a voltage while the second electrode formed on at least one side wall of the box cavity is negative polarity.

11. The 3D conversion lens as claimed in claim 1, wherein charges carried by the opaque charged particles are positive charges or negative charges.

12. The 3D conversion lens as claimed in claim 1, wherein the opaque charged particles comprise opaque pigment.

13. The 3D conversion lens as claimed in claim 12, wherein the opaque pigment is black pigment.

14. The 3D conversion lens as claimed in claim 1, wherein the microcapsules are hollow capsules.

15. The 3D conversion lens as claimed in claim 1, wherein the first electrode formed on the first substrate is a block transparent electrode.

16. The 3D conversion lens as claimed in claim 1, wherein the second electrode formed on at least one side wall of the box cavity is a block transparent electrode, and is arranged on side walls of at least two opposite sides of the box cavity.

17. A 3D glasses, comprising a 3D conversion lens, a power module connected with a peripheral circuit of the 3D conversion lens, and control means connected with the power module and the peripheral circuit of the 3D conversion lens, characterized in that the 3D glasses uses a 3D conversion lens as claimed in claim 1; the control means comprises a power control module connected with the power module, for controlling the power module to switch polarity of voltages applied on respective transparent electrodes.

18. A 3D conversion control method, comprising:
    providing a first substrate and a second substrate for forming a box, wherein a first electrode is formed on the first substrate, a second electrode is formed on at least one side wall of a box cavity of the box;
    filling electronic ink in the box cavity of the box, the electronic ink consisting of a dispersion medium and opaque charged particles dispersed in the dispersion medium;
    when the polarity of the second electrode on the side wall of the box cavity is opposite to polarity of charges carried by the opaque charged particles, the opaque charged particles moving to the side wall of the box cavity to realize light transmissive display; when the polarity of the first electrode on the first substrate is opposite to the polarity of the charges carried by the opaque charged particles, the opaque charged particles moving to the first substrate to realize non light transmissive display, wherein the opaque charged particles are microcapsules, and charges carried by all the opaque charged particles in the electronic ink have the same polarity.

* * * * *